United States Patent
Yoon et al.

(10) Patent No.: US 8,838,578 B2
(45) Date of Patent: Sep. 16, 2014

(54) INTERACTIVE QUERY PLAN VISUALIZATION AND OPTIMIZATION

(75) Inventors: Yongsik Yoon, Seocho-ku (KR); Chanho Jeong, Seocho-ku (KR); Sang Kyun Cha, Seocho-ku (KR)

(73) Assignee: SAP SE, Walldorf (DE)

( * ) Notice: Subject to any disclaimer, the term of this patent is extended or adjusted under 35 U.S.C. 154(b) by 63 days.

(21) Appl. No.: 13/323,563

(22) Filed: Dec. 12, 2011

(65) Prior Publication Data

US 2013/0151505 A1    Jun. 13, 2013

(51) Int. Cl.
*G06F 17/30* (2006.01)

(52) U.S. Cl.
USPC .......................................... 707/718; 707/719

(58) Field of Classification Search
None
See application file for complete search history.

(56) References Cited

U.S. PATENT DOCUMENTS

| | | | |
|---|---|---|---|
| 6,434,545 B1* | 8/2002 | MacLeod et al. ..................... 1/1 |
| 6,704,724 B1* | 3/2004 | Ellmann et al. ............... 707/718 |
| 7,234,112 B1* | 6/2007 | Brown et al. ................. 715/713 |
| 8,005,870 B1* | 8/2011 | Bedell et al. .................. 707/802 |
| 8,190,595 B2* | 5/2012 | Bruno et al. .................. 707/713 |
| 2007/0143246 A1* | 6/2007 | Bestgen et al. .................... 707/2 |
| 2010/0036801 A1* | 2/2010 | Pirvali et al. ....................... 707/2 |
| 2011/0282716 A1* | 11/2011 | Fenstermaker et al. ...... 705/7.39 |
| 2012/0259896 A1* | 10/2012 | Peukert ......................... 707/798 |

OTHER PUBLICATIONS

Authors: Thomas Brinkhoff, Hans-Peter Kriegel, Bernhard Seeger. Title: Efficient Processing of Spatial Joins Using R-trees Date: 1993; Published by ACM SIGMOD May 1993 Washington DC.*

* cited by examiner

*Primary Examiner* — Christyann Pulliam
*Assistant Examiner* — Robert Adams
(74) *Attorney, Agent, or Firm* — Fountainhead Law Group PC

(57) ABSTRACT

A computer system affords a user the ability to interactively formulate, visualize, and modify query plans that are to be posed to a database. The computer system provides query visualization in the form of decision trees having nodes selectable/deselectable to search for alternative query plans with lower or minimum execution time. The estimated cost and/or the execution time of a subtree of a query plan may be mapped according to a rectangle area metaphore, with the area of a rectangle enclosed by a larger rectangle representing a parent node in the plan tree. Query plans may be saved by the system in order to facilitate their visualization, optimization, and/or modification at a later date.

17 Claims, 15 Drawing Sheets

```
<relation nodeId="0x00007fffcdf41ff0">
    <type name="PROJECT " />
    <project cols="( X (1, 0) , X (2, 0) , X (3, 0) /> 
    <children><child id="0x00007fffcdf4b8c0" /></children>
</relation>
<relation nodeId="0x00007fffcdf4b8c0">
    <type name="INNER HASH JOIN " />
...
```

INTERACTIVE QUERY PLAN VISUALIZATION AND OPTIMIZATION

BACKGROUND

The present invention relates to computing, and in particular, to a systems and methods for visualizing and optimizing a query to a database.

Unless otherwise indicated herein, the approaches described in this section are not prior art to the claims in this application and are not admitted to be prior art by inclusion in this section.

Databases are highly useful tools allowing users to manage complex relationships between different types of data. For example, a database may be organized in rows and columns, with rows representing different data entities and columns representing related data types common to those entities. Databases are typically created and maintained in an application level language such as Structured Query Language (SQL).

Conventionally, it may be challenging to design a user interface that is able to interact in an effective and efficient manner with the underlying database. One reason for this is that the user of the database is typically not familiar with the query execution flow in the database, as SQL is a declarative language rather than a procedural language.

While the SQL may allow the user to interact with the database in an intuitive manner, it may not afford the user sufficient transparency into the application level structure of the database to achieve efficiency querying. For example, owing to a lack of knowledge of the actual statistics of the database, the query optimizer may mistakenly construct an inefficient query execution plan that consumes excessive computing resources and hence is not cost-effective and/or practicable to execute.

The result of such inefficient querying may be to consume excessive processing resources, and/or to cause delays in the system. Apart from abnormally long processing delays, a database user may not be able to recognize such inefficiency. Moreover, even if the inefficiency is recognized, the database user may not be able to understand the source of the inefficiency, and be in a position to correct it by choosing alternative query execution plan with a given query.

The present disclosure addresses these and other issues with systems and methods allowing a user to visualize and optimize a query that is to be posed to a database.

SUMMARY

A computer system affords a user the ability to interactively formulate, visualize, and modify query plans that are to be posed to a database. The computer system provides query visualization in the form of decision trees having nodes selectable/deselectable to search for alternative query plans with lower or minimum execution time. The estimated cost and/or the execution time of a subtree of a query plan may be mapped according to a rectangle area metaphor, with the area of a rectangle enclosed by a larger rectangle representing a parent node in the plan tree. Query plans may be saved by the system in order to facilitate their visualization, optimization, and/or modification at a later date.

An embodiment of a computer-implemented method comprises:

providing in a non-transitory computer readable storage medium at a server, a database comprising data organized in tables;

posing a query to the database through an engine;

causing the engine to provide to a user, a visual representation of a database query plan search space;

based upon the visual representation of the database query plan search space, providing a query plan manipulation request to the database through the engine;

returning to the engine from the database, a result of the query plan manipulation request;

causing the engine to display the result to the user; and storing the result in a second non-transitory computer readable storage medium.

An embodiment of a non-transitory computer readable storage medium embodies a computer program for performing a method, said method comprising:

posing through an engine, a query to a database stored in a second non-transitory computer readable storage medium at a server, the database comprising data organized in tables;

causing the engine to provide to a user, a visual representation of a database query plan search space;

based upon the visual representation of the database query plan search space, providing a query plan manipulation request to the database through the engine;

returning to the engine from the database, a result of the query plan manipulation request;

causing the engine to display the result to the user; and storing the result in the non-transitory computer readable storage medium.

An embodiment of a computer system comprises:

one or more processors;

a software program, executable on said computer system, the software program configured to:

pose through an engine, a query to a database stored in a second non-transitory computer readable storage medium at a server, the database comprising data organized in tables;

cause the engine to provide to a user, a visual representation of a database query plan search space;

based upon the visual representation of the database query plan search space, provide a query plan manipulation request to the database through the engine;

return to the engine from the database, a result of the query plan manipulation request;

cause the engine to display the result to the user; and store the result in the non-transitory computer readable storage medium.

In certain embodiments the visual representation of the database query plan search space comprises a tree structure including a plurality of nodes.

Some embodiments further comprise displaying a cost of an individual node based upon interaction between a user and the visual representation through an interface.

According to particular embodiments the visual representation of the database query plan search space may comprises a polygon area metaphor.

In some embodiments the result comprises an actual execution time.

In some embodiments the result comprises an estimated cost generated by an optimizer module.

The following detailed description and accompanying drawings provide a better understanding of the nature and advantages of the present invention.

BRIEF DESCRIPTION OF THE DRAWINGS

FIG. 2AA is an enlarged view of the view of FIG. 2A with a tooltip showing details of one proposed node.

DETAILED DESCRIPTION

The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, examples and specific details are set forth in order to provide a thorough understanding of various embodiments of the present invention. It will be evident, however, to one skilled in the art that the present invention as defined by the claims may include some or all of the features in these examples alone or in combination with other features described below, and may further include modifications and equivalents of the features and concepts described herein.

Embodiments of the present invention relate to methods and apparatuses affording a user the ability to interactively formulate, visualize, and modify query plans that are to be posed to a database. A database query may be visualized in the form of decision trees having nodes that are selectable/deselectable to search for alternative query plans having reduced or minimum execution time. The estimated cost and/or the execution time of a subtree of a query plan may be mapped according to a rectangle area metaphore, with the area of a rectangle enclosed by a larger rectangle representing a parent node in the plan tree. Query plans may be saved by the system in order to facilitate their visualization and optimization at a later date.

Figure 1:
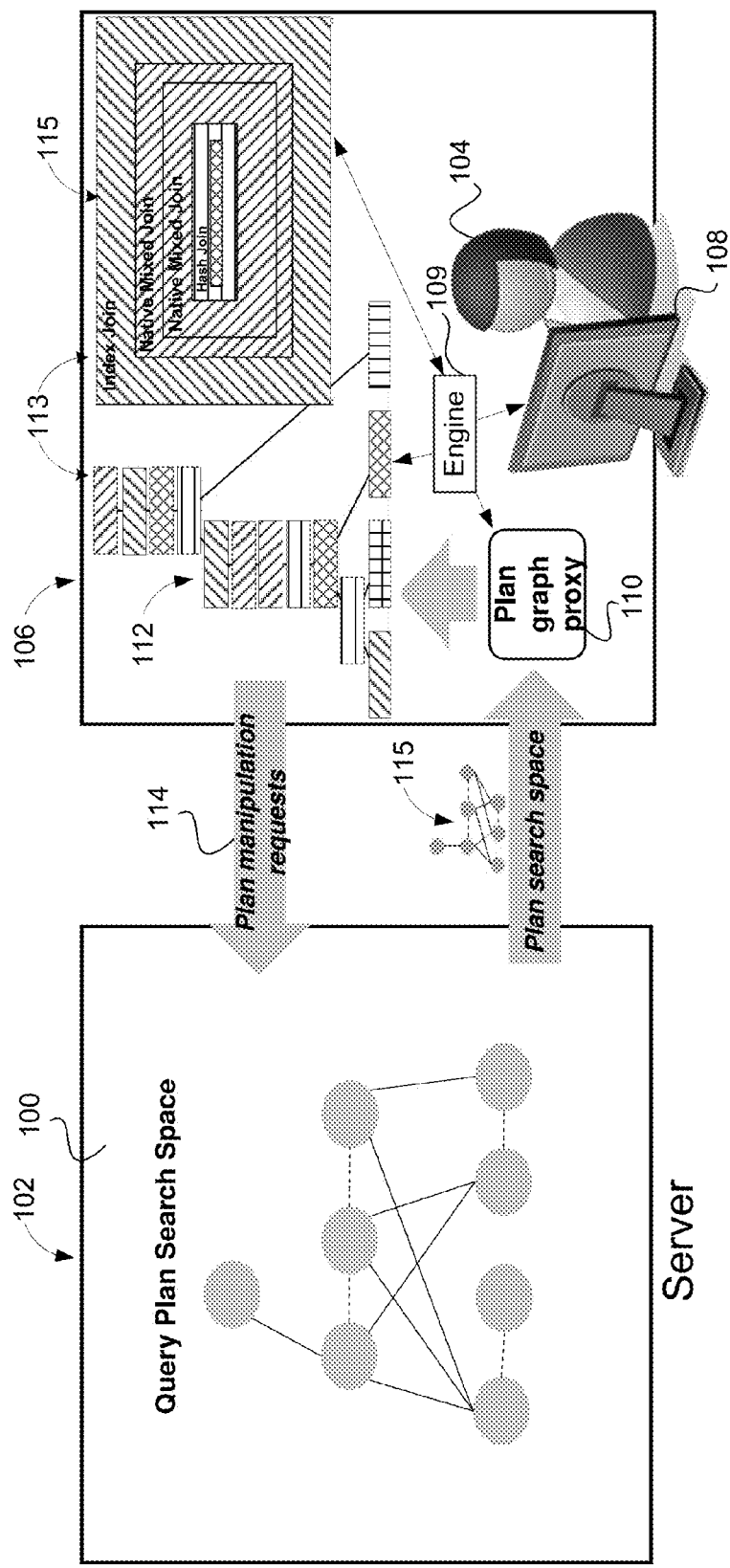
FIG. 1 shows a simplified block diagram of an architecture for a query visualization and optimization system according to one embodiment.

FIG. 1 shows a simplified block diagram of an architecture for a query visualization and optimization system according to one embodiment. Database information 100 is created and stored in an application level language on database server 102. An example of such an application level language is SQL.

User 104 is configured to interact with the database through a local client computer system 106. Client computer 106 has stored thereon a user interface 108 to a query planning engine 109 which provides a graphical representation(s) of a plan for querying the database.

As indicated in FIG. 1, by interacting with the interface 108 the user 104 may both visualize and manipulate a plan for posing queries to return specific information from the database. This plan is shown in FIG. 1 as the plan graph proxy 110. As discussed in detail below, this graphical representation of the query plan can take the form of a decision tree 112 having various alternative query plans.

Based on the plan created by the user in the interface, plan manipulation requests 114 can be issued from the client to the database server. In view of the information requested by the plan, the database server 102 can return to the client, a visual representation 113 of the manipulated plan with execution results from the database space. As discussed in detail below, this representation can take the form of a decision tree 112, or a series of overlapping rectangles 115 whose areas reflect an estimated cost of, and/or an actual execution time associated with various nodes of the query plan.

Figure 2:
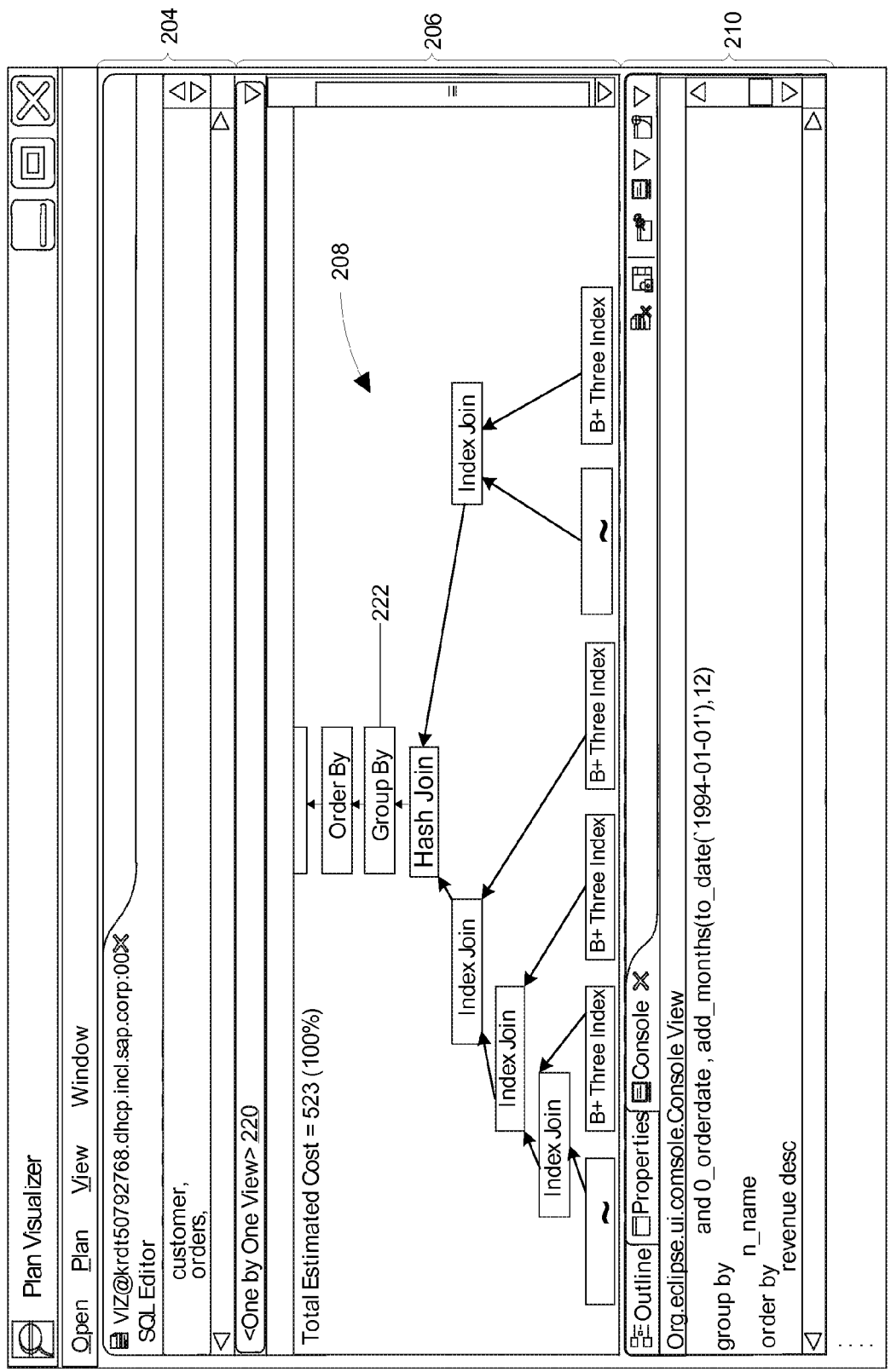
FIG. 2 shows a simplified view of a user interface to a query planning engine according to an embodiment.

FIG. 2 shows a simplified view of a user interface to a query optimizer according to an embodiment of the present invention. Specifically, interface 200 comprises a plurality of regions allowing the user to perform certain tasks. For example, a menu bar 202 allows the user to commence an activity. Editor 204 allows the user to identify a connected database that is to be searched as part of the query plan.

The interface of FIG. 2 includes a graphical viewer 206 that is configured to display to the user, a visual representation 208 of the query plan as a tree structure.

The interface of FIG. 2 further includes a tab folder 210 offering a choice of views to a user. Examples of such alternative views include an outline view, a properties view, and a console view.

In operation, a user accesses the interface and enters into the editor, particular terms forming the basis for a proposed query plan. Based upon this input from the user, as well as information gleaned from the server regarding the internal structure and organization of the database, the database generates the plan and returns to the user a visual representation thereof.

In the particular embodiment of FIG. 2, the generated query plan is represented to the user in a one-by-one view. That is, the one-by-one view 220 depicts query plan as a hierarchical sequence of nodes 222 displayed in tree format.

Based upon the query plan that has been generated, the interface then causes the client to communicate with the server and interrogate the database, returning an estimated cost of actually executing the query plan. This returned estimated cost may be visually represented to the user in a number of possible ways.

Figure 2A:
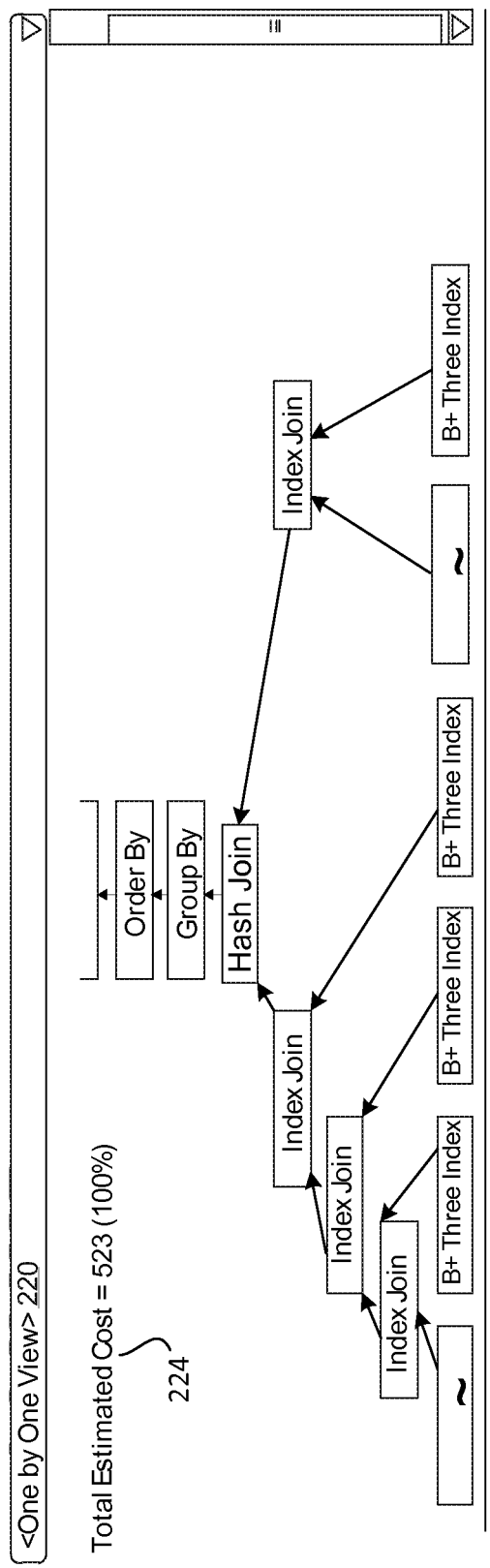
FIG. 2A shows a query plan as tree format and its cost represented to a user in a one-by-one view.
Figure 2A:
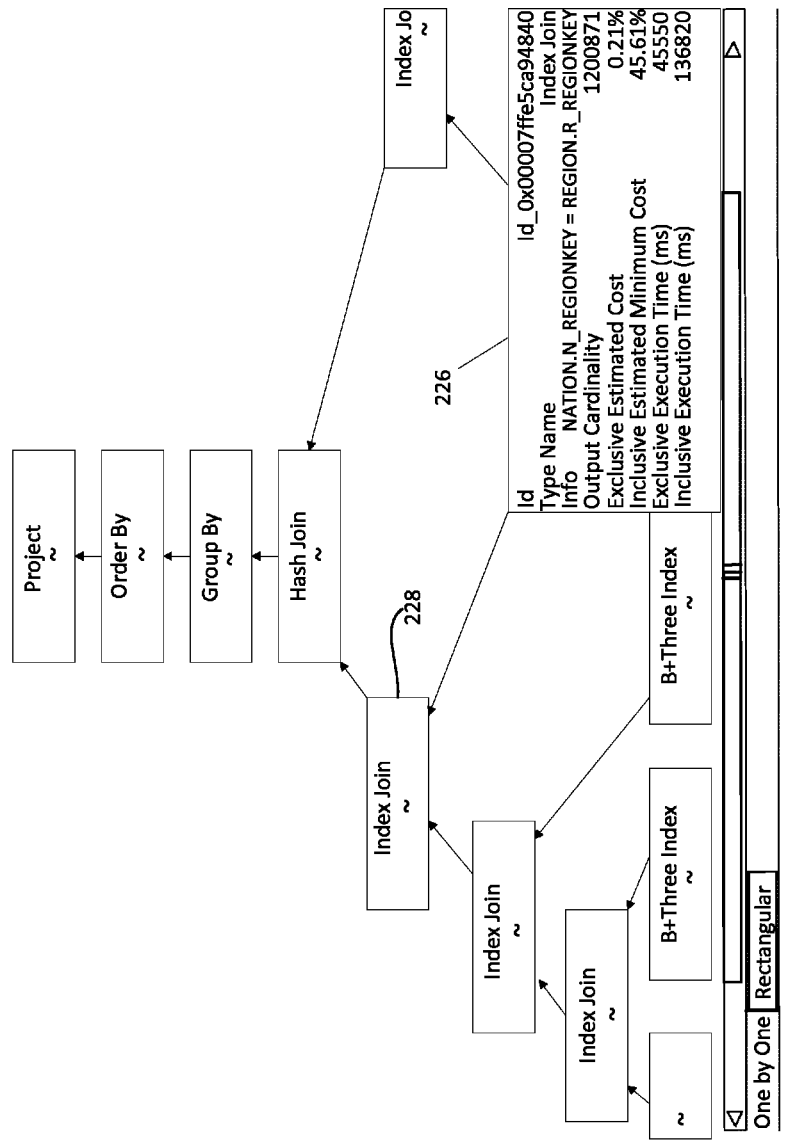

In FIG. 2A, the cost of the query plan is represented to the user in the one-by-one view. Specifically, the total estimated cost 224 of the proposed query plan is returned to the user. The various nodes are shown in tree format, with each node depicted by a rectangle having the same size. Each node includes both exclusive and inclusive estimated cost, which serve as a gauge of efficiency and cost-effectiveness.

In the manner shown in FIG. 2A, the one-by-one visual representation from the query plan engine displays a single, minimum cost plan to the user. This makes it easy for the user to search through alternative query plans in order to come up with a query appropriate from efficiency and cost-effectiveness perspectives.

Additional details regarding the cost of a particular node or group of nodes, can be accessed by moving the cursor over particular nodes (rectangles) displayed by the interface. For example, in the enlarged view of FIG. 2AA, the tooltip 226 shows the details of one proposed node 228 (of the Index Join type). Such details include the exclusive and inclusive execution times for that particular node.

Figure 2B:
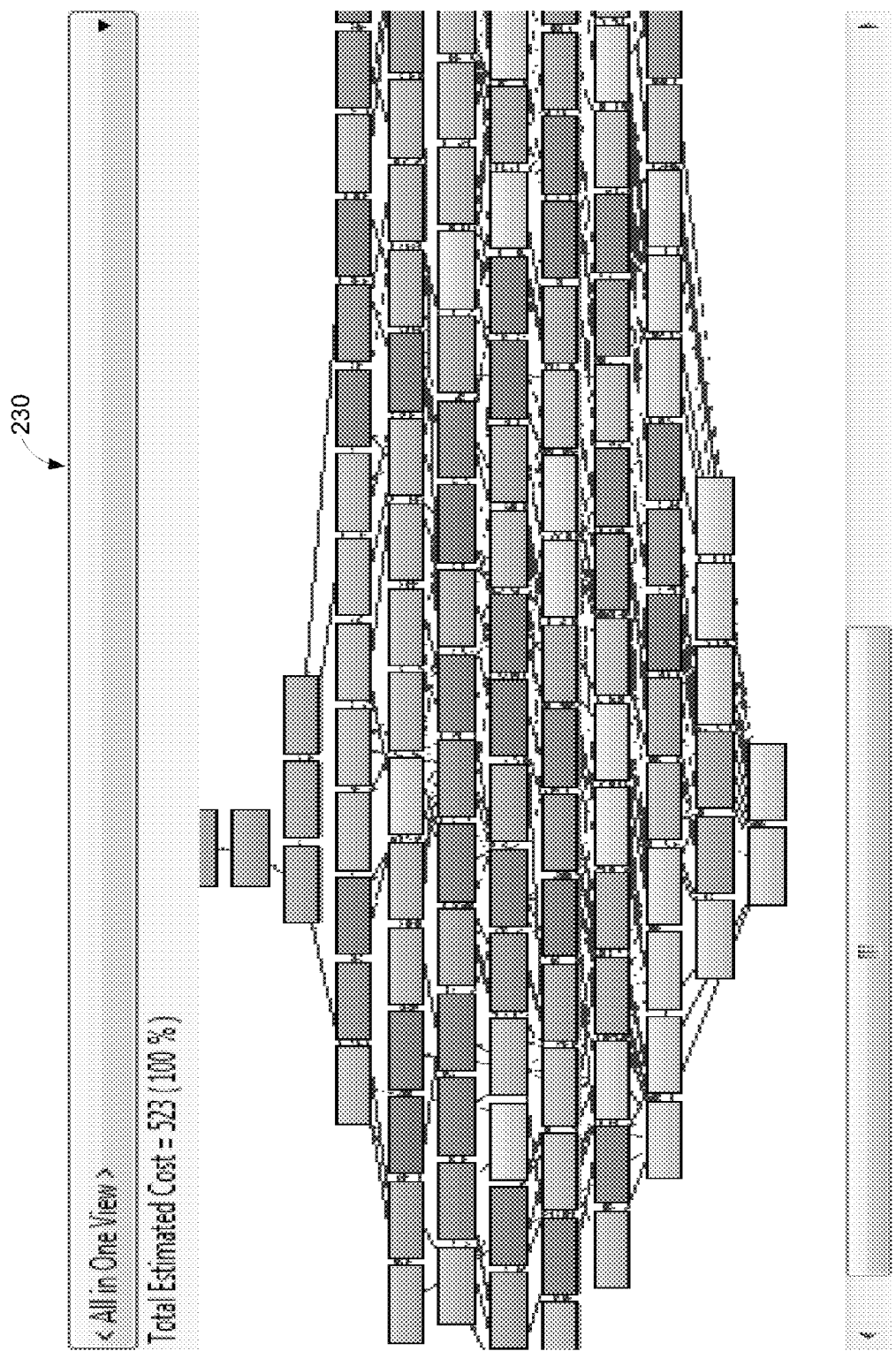
FIG. 2B shows an alternative view representing query plan search space as tree format and the cost of one proposed plan.

A cost of a query plan may be graphically represented to a user in other ways. For example, FIG. 2B shows an alternative view, the all-in-one view 230. This view offers the advantage of displaying all relational operators in the database, including alternatives, in the form of a tree structure. However, in many applications this view will be of limited use to a user, due to the complexity and large number of nodes displayed.

Figure 2C:
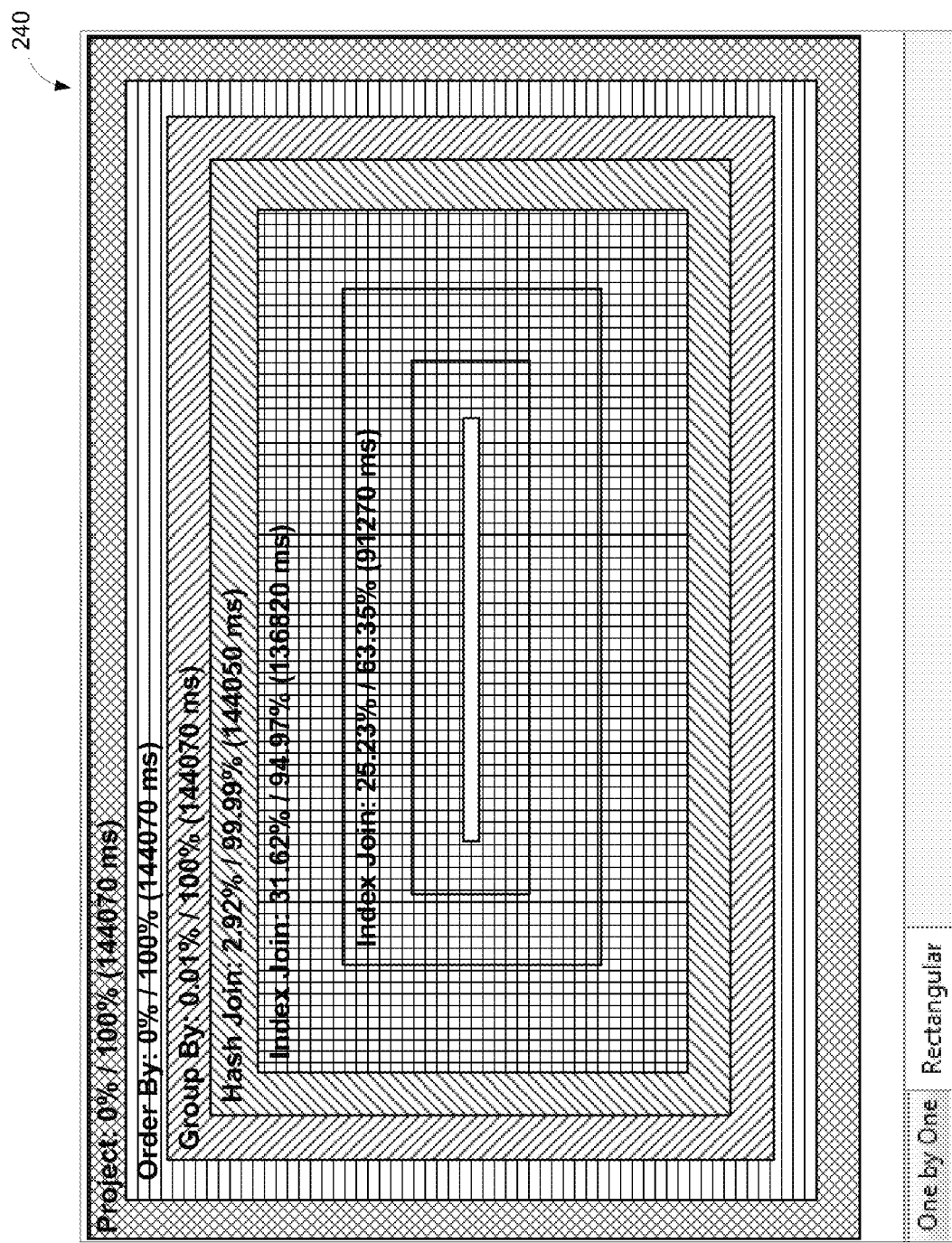
FIG. 2C shows yet another graphical representation of a cost of a query plan.

FIG. 2C shows yet another graphical representation of the cost of a query plan. Specifically, choosing to display the query plan according to a rectangle area metaphor ("Rectangular" view), results in nodes of the proposed query plan being depicted as a series of overlapping rectangles 240. Depending upon the particular view, the area of each rectangle may be determined based upon a node's cost factor—for example estimated cost or execution time.

Figure 2D:
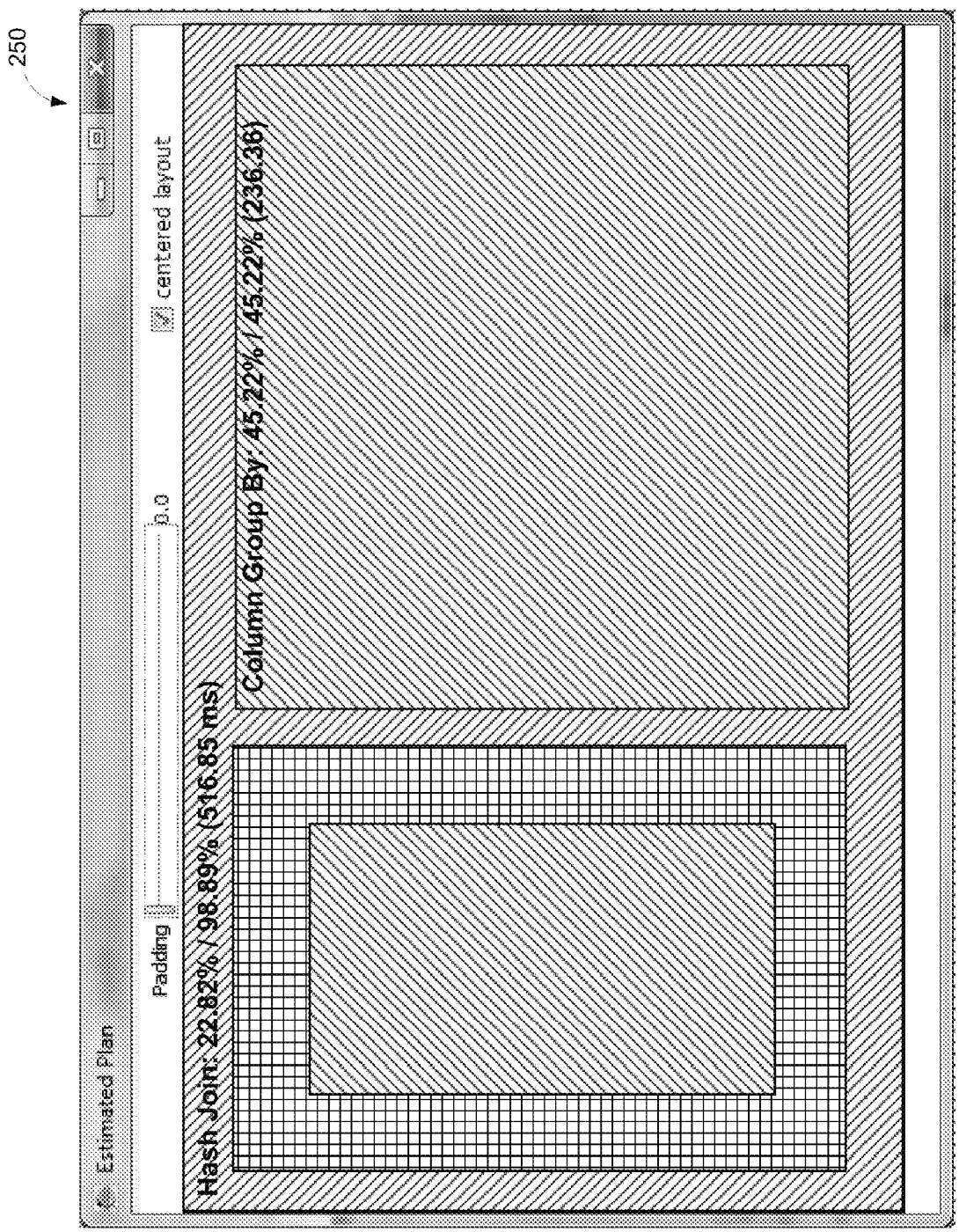
FIG. 2D shows a rectangular view of an estimated cost basis for rectangle area.

For example, FIG. 2D shows a rectangular view 250 employing an estimated cost basis for rectangle area. In this particular embodiment, an estimated cost-based ratio is used to determine the area of each rectangle. Such an estimated cost can be determined through use of an optimizer that predicts performance based upon factors such as database table size, and filter selectivity.

Figure 2E:
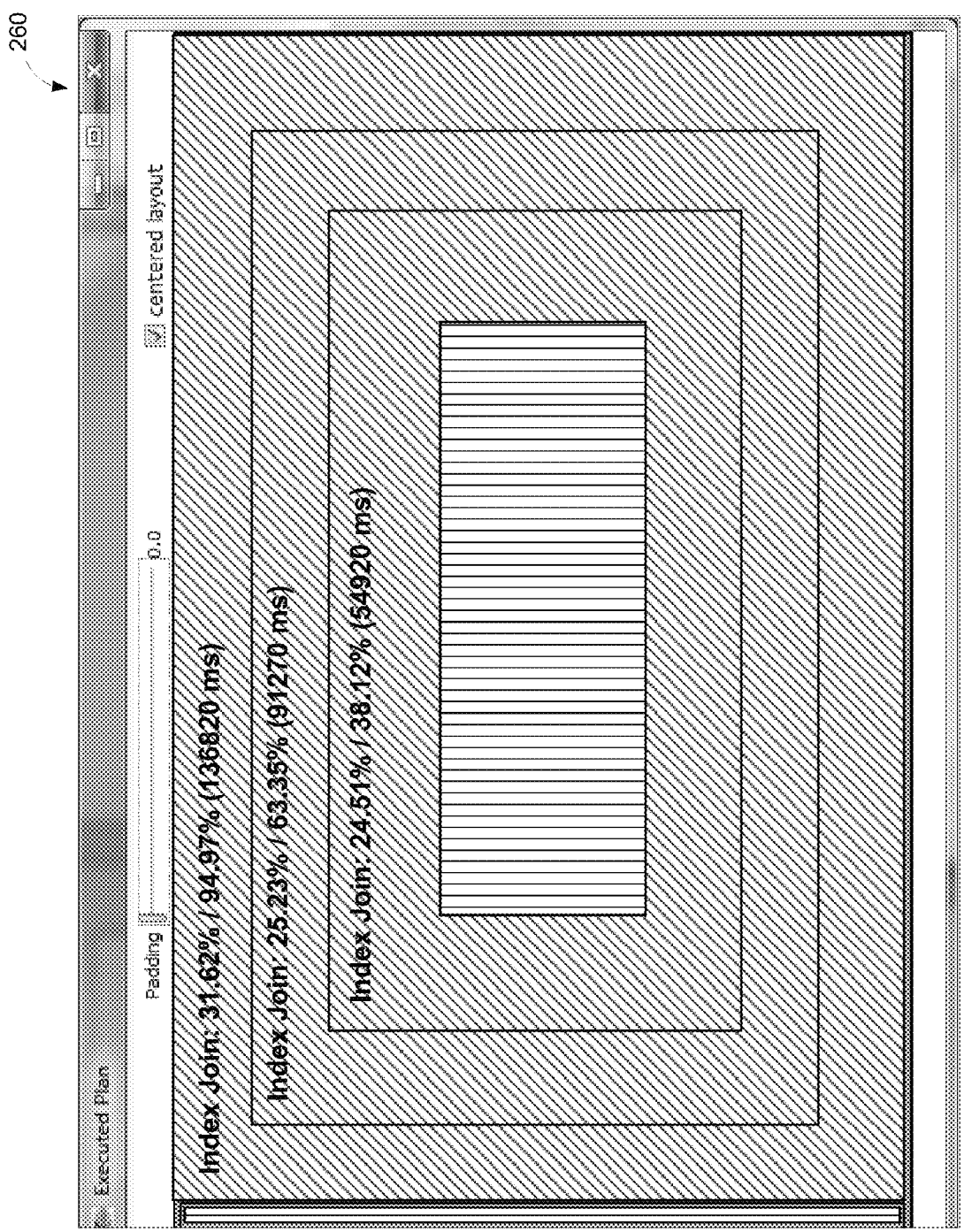
FIG. 2E shows a rectangular view of an execution time basis for rectangle area.

FIG. 2E shows an alternative rectangular view 260 employing an execution time basis for rectangle area. In this particular embodiment, an executed time-based ratio is used to determine the area of each rectangle. In particular, this representation shows the actual (rather than predicted or forecasted) time consumed to execute nodes of the query plan.

A query plan that is generated and visualized at the client utilizing a query optimizer according to embodiments of the invention, may allow for optimization by a user. The following example describes a user manually selecting a query plan.

EXAMPLE

Figure 3A:
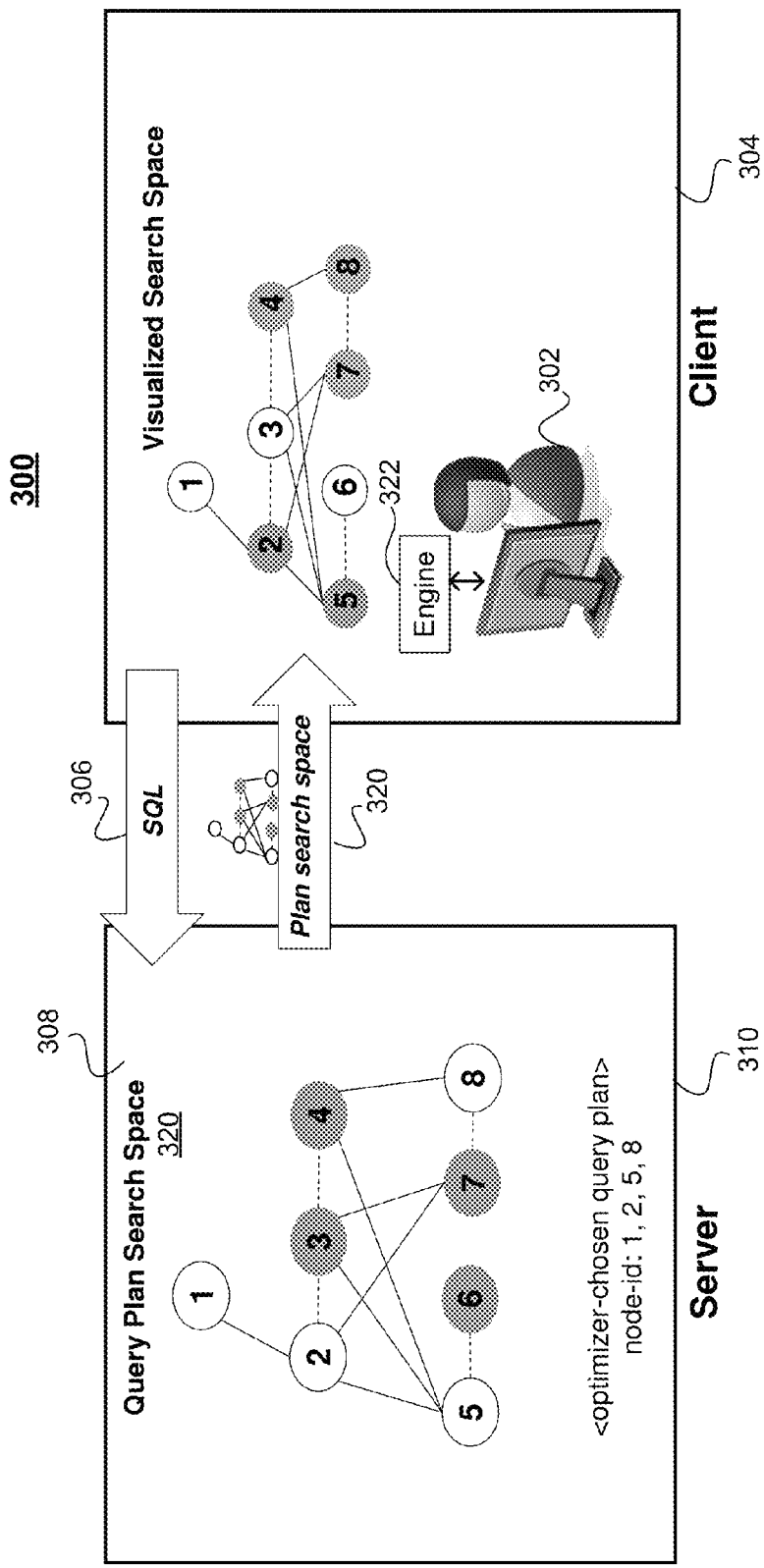
FIGS. 3A-C are simplified block diagrams showing a user employing direct query plan manipulation through node pinning.
Figure 3B:
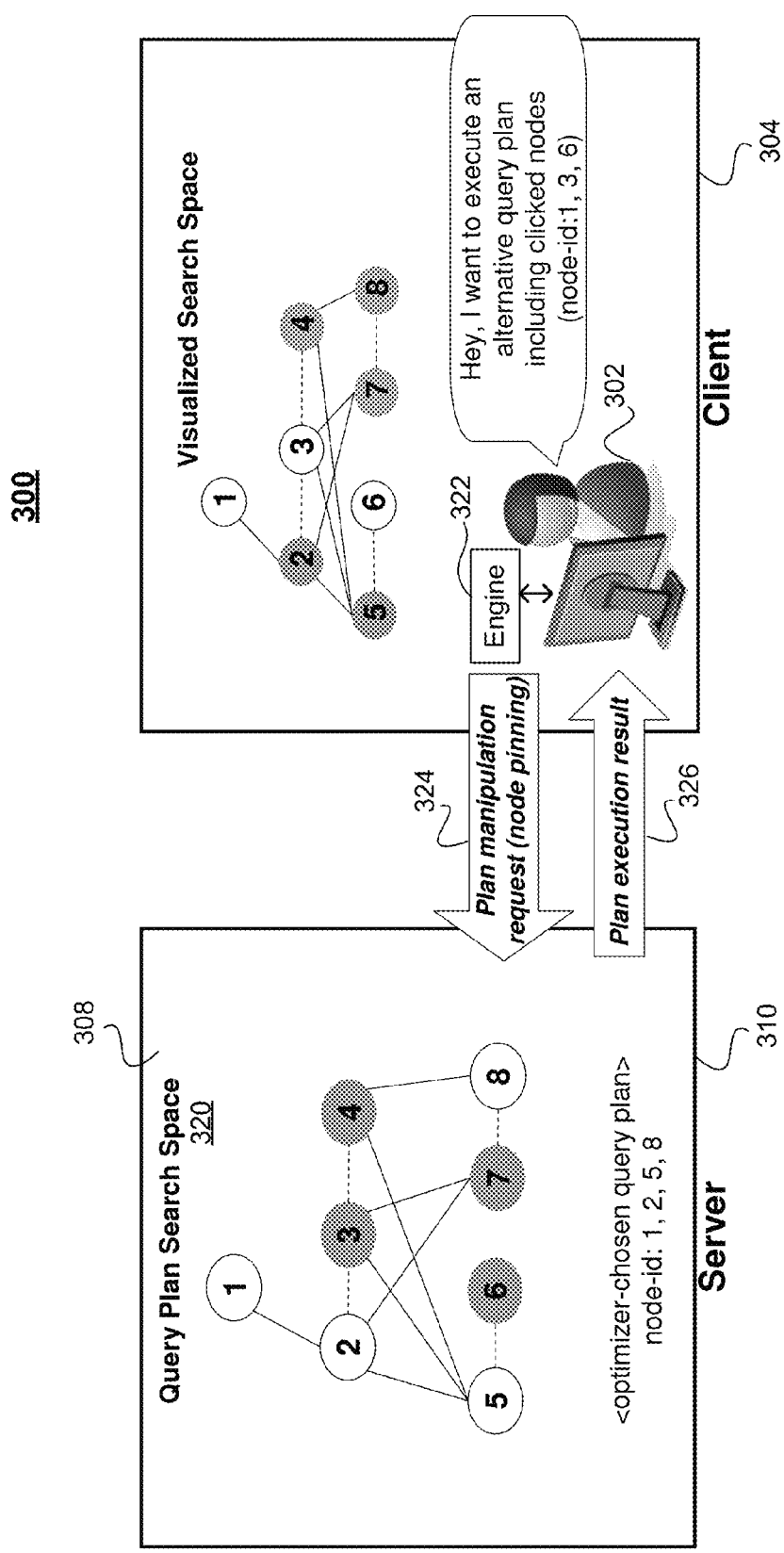
Figure 3C:
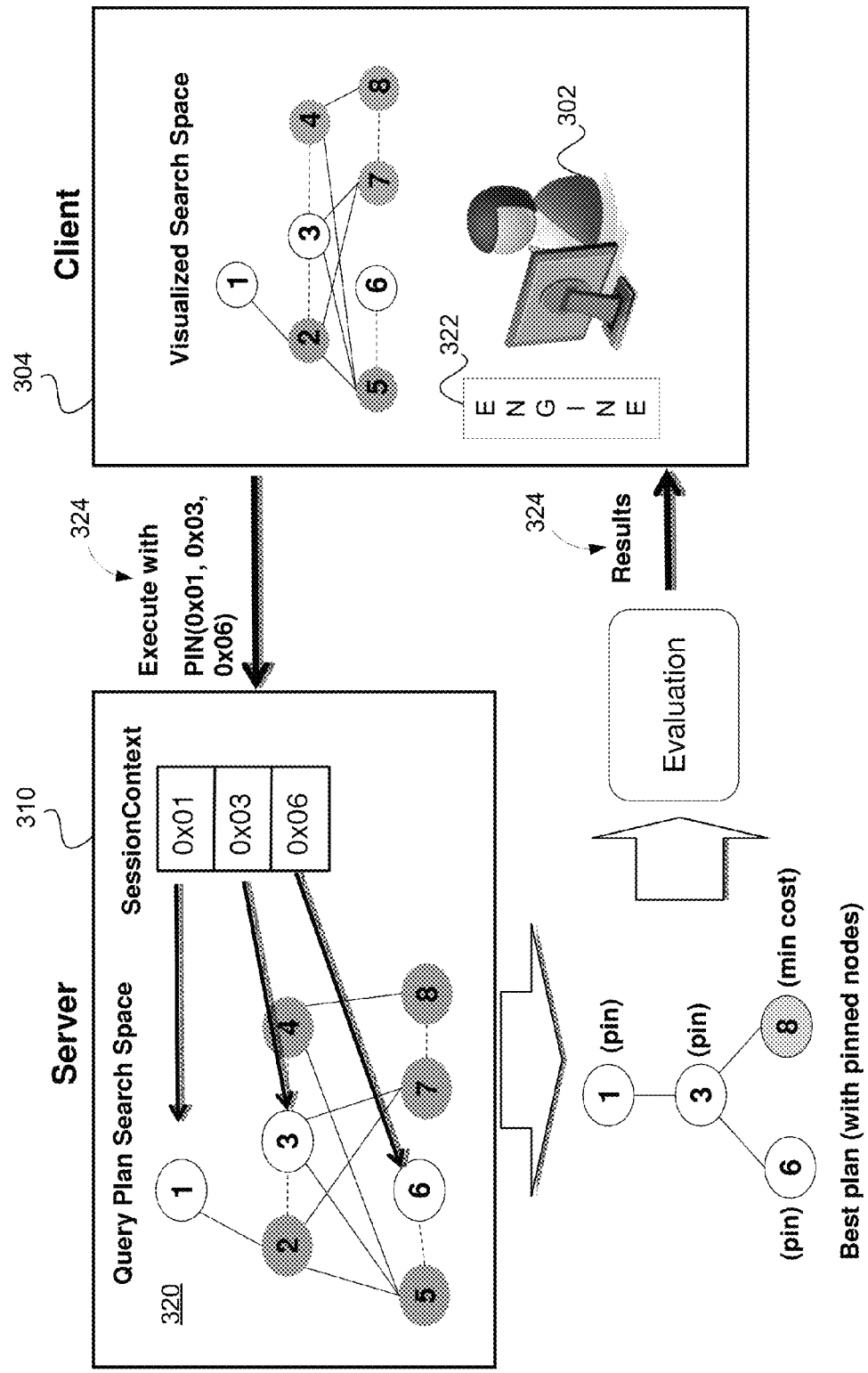

FIGS. 3A-C are simplified block diagrams showing a user employing direct query plan manipulation through node pinning according to an embodiment. Specifically, FIG. 3A shows a system 300 wherein a user 302 at a client 304 has posed a query 306 in the form of structured query language (SQL) to a database 308 in a server 310.

In response, the server has returned to the client and user via the query engine 322 including an optimizer module, a visual representation of the query plan search space 320. Here, the query plan search space implicates nodes 1-8, with dashed lines between nodes indicating alternative query plans.

As shown in FIG. 3B, based upon the user's review of the returned visualized search space, the user has decided to manipulate the query plan by selecting alternative nodes and execute it in order to search for an optimal plan. In particular, the user has selected nodes 1, 3, and 6 by clicking on them.

The user then manually issues a plan manipulation request 224 through the engine and the server, pinning (fixing) the nodes 1, 3, and 6 as a part of the request 224. In response to this plan manipulation request, the database server returns to the client, a plan execution result 226 including the pinned nodes.

This process is shown in detail in FIG. 3C. In particular, the plan manipulation request includes specific instructions relating to the pinned nodes 1, 3, and 6. Execution of the query on the database returns a manipulated plan execution result including nodes 1, 3, 6, and 8. By evaluating the execution result the user may find out whether the plan with pinned nodes actually reduces execution time. Through this process the user may pin or fix a set of certain nodes for a particular plan, to obtain an optimized execution result.

These results are returned to the user for visualization at the client. For example, as shown in this particular example, the returned plan execution result may be visualized in the form of a tree structure having nodes and subtrees. Alternatively or in conjunction with such visualization, the returned plan execution result may be displayed by the engine to the user through an interface, according to a rectangle area metaphor as has been described above.

Based upon this visualization, the user may decide to further refine the query plan, and issue another plan manipulation request pinning a different set of nodes. To facilitate this process, the original plan execution result may be stored at the client, allowing later visualization and comparison with other plan execution results that have previously been run.

Figure 3D:
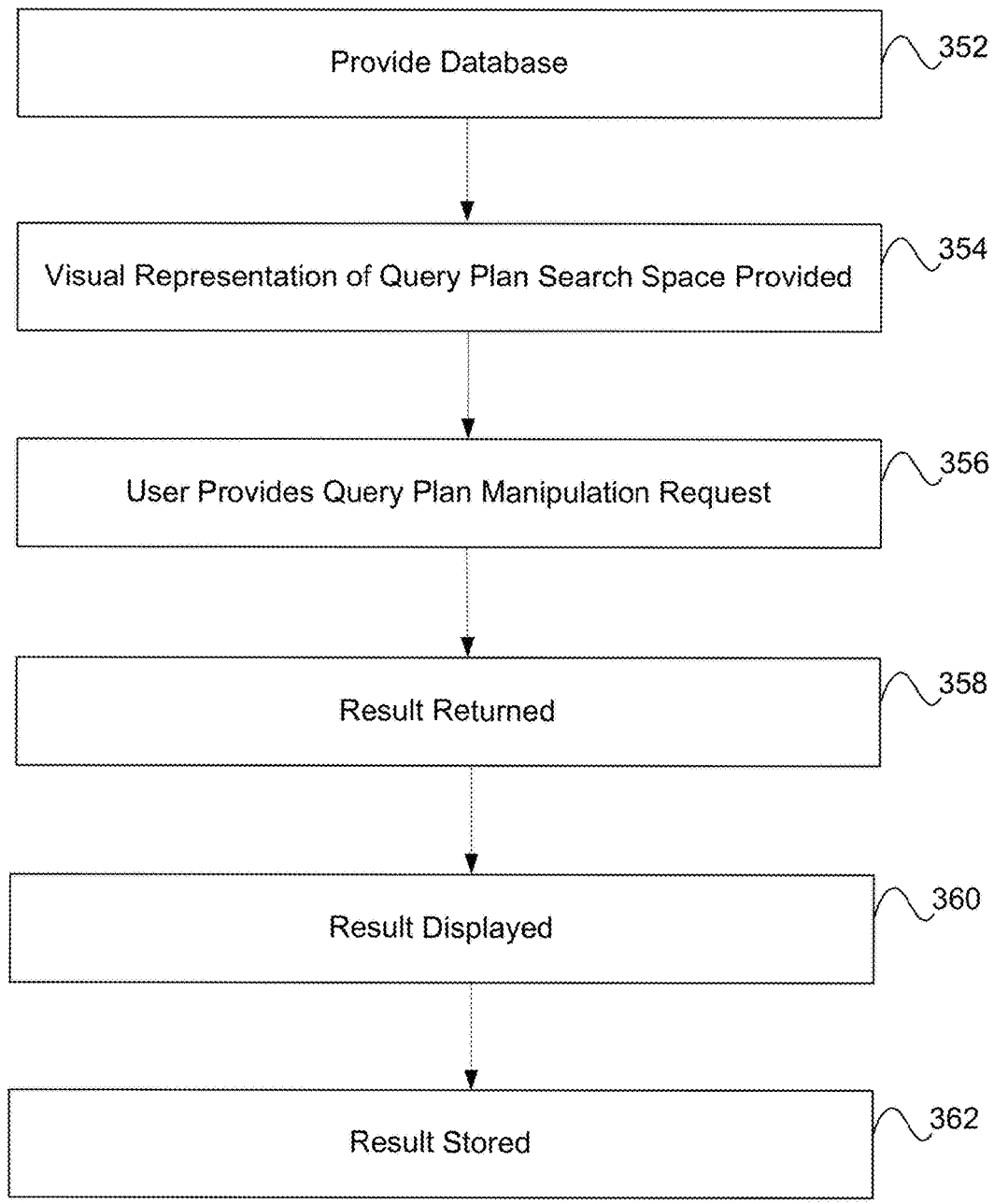
FIG. 3D provides a simplified flow chart illustrating a series of steps of one embodiment of a method 300 of query plan visualization and optimization.

FIG. 3D provides a simplified flow chart illustrating a series of steps of one embodiment of a method 350 of query plan visualization and optimization. In a first step 352, a database comprising data organized in tables is provided at a server.

In a second step 354, a visual representation of a query plan search space of the database is provided to a user by an engine. In a third step 356, based upon the visual representation of the query plan search space, the user provides a query plan manipulation request to the database through the engine.

In a fourth step 358 the server returns to the engine, a result. As described above, this result may be in the form of an estimated cost, or an actual cost of the query (e.g. in terms of execution time). In a fifth step 360, the result is displayed to the user by the engine.

In a sixth step 362, the result is stored by the user in a non-transitory computer readable storage medium. As indicated by the loop in FIG. 3D, based upon the stored result, the user can in turn access the visual representation and provide another query plan manipulation request to optimize the query.

Figures 4A, 4B:
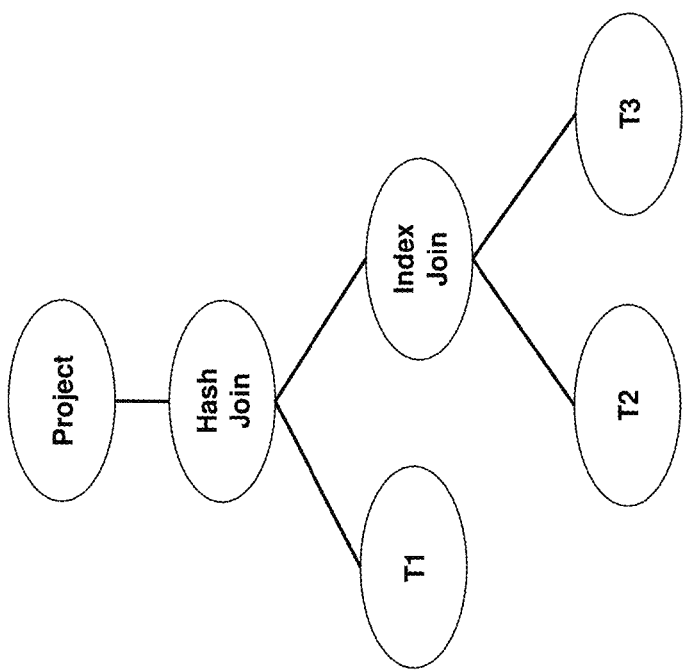
FIG. 4A shows a highly simplified view of an example of a query plan that may be stored.
FIG. 4B shows physical query plan serialization.

As indicated above, once a query plan has been formed and visualized according to embodiments of the present invention, it can be stored for later reference and use. FIG. 4A shows a highly simplified view of an example of a query plan involving database tables (T1-T3), that may be stored.

FIG. 4B shows an example of physical query plan serialization. In particular, the selected plan may be serialized in a neutral format (such as XML). A physical execution plan may be built directly by deserializing the stored plan. Such an approach offers potential benefits that may include but are not limited to flexibility, portability, version management, and access to non-SQL nodes (json).

Once stored, a query plan may exhibit a given lifecycle. The physical query plan may be persistently stored. The plan may be pinned in the query cache, and should be available even after the query recompilation or server restart.

Figure 5:
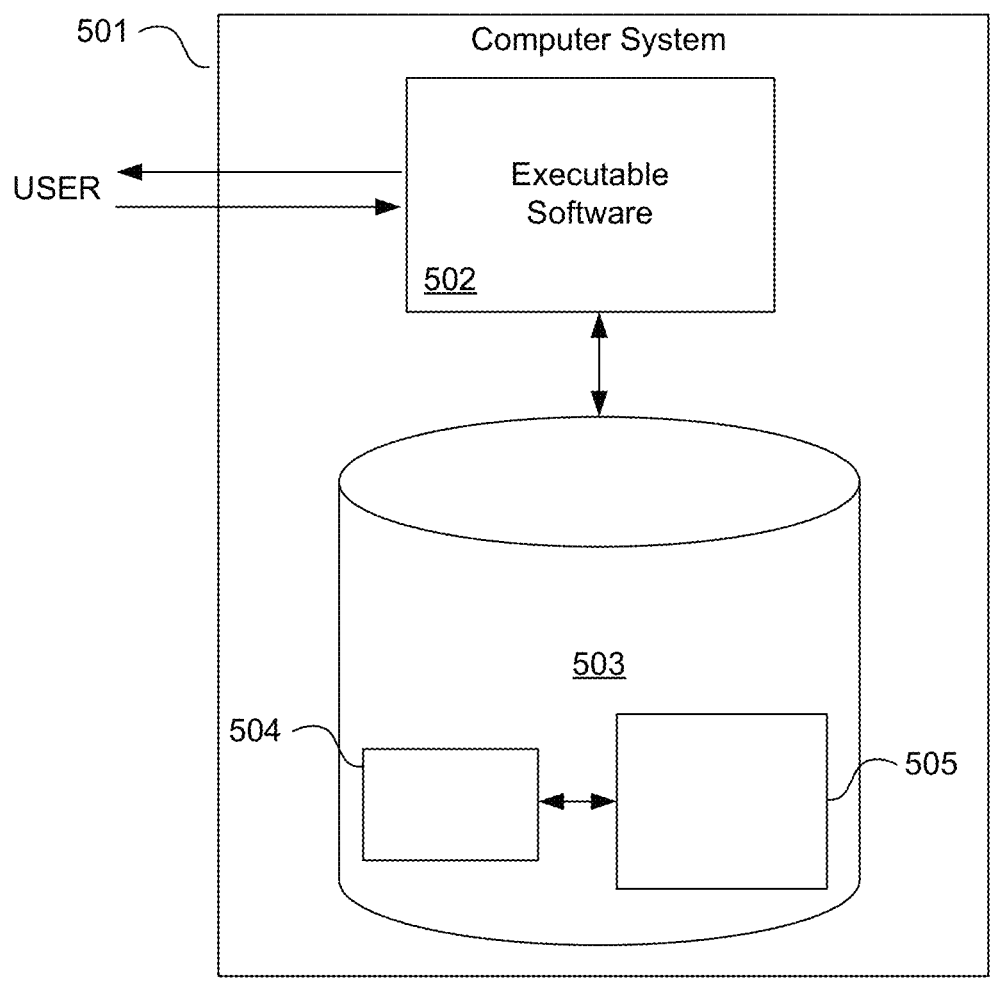
FIG. 5 illustrates hardware of a special purpose computing machine configured to implement query visualization and optimization according to an embodiment.

FIG. 5 illustrates hardware of a special purpose computing machine which may correspond to a client remote from the server including the database. This computing machine may be configured to implement query visualization and/or optimization according to certain embodiments.

In particular, computer system 500 comprises a processor 502 that is in electronic communication with a non-transitory computer-readable storage medium 503. This computer-readable storage medium has stored thereon code 505 corresponding to the query engine. Code 504 corresponds to a query optimizer module. Code may be configured to reference data stored in a database of a non-transitory computer-readable storage medium, for example as may be located in a remote database server.

Database query visualization and optimization according to various embodiments may offer certain benefits. For example, visualization may provide insight into database structures for more ready explanation of query operation.

The user interface may allow interactive selection of operators and rules, and facilitate the search of alternative plans matching real execution cost. For example, the rectangle area metaphor may allow the cost of a subtree to be mapped to the area of a rectangle, which is enclosed by a bigger rectangle representing its parent node in the plan tree.

Embodiments of the present invention may address difficulties of dealing with complex queries, allowing identification of mismatch between optimizer world and real database world, for example searching rectangles with similar area ratio Embodiments of the present invention may facilitate browsing and searching of large plan search spaces. For example, a plan search space may be visualized with a drill-down interface in combination with coloring as visual indicators.

Embodiments of the present invention may facilitate manual exploration of query plans by a user, for example by direct manual plan selection and execution, followed by storage of the results for later use. Moreover, a user may browse top N alternative query plans. Certain embodiments may provide manual statistics feedback, and an executable trace.

Various embodiments may support various features through graph operations. Examples of such features include but are not limited to plan search space manipulation, browsing/executing plan search space, activating/deactivating optimizer enumeration rule(s), activating/deactivating query transformation rule(s), selection of physical operators, node pinning, manual selection of query plans, plan profiling, area-based views, comparison between estimated and actual cost (for example in the form of execution time).

Embodiments may also allow individual subtree execution. This feature may allow a user to compare the result and performance between alternative subtrees of a query plan.

Embodiments of query visualization and optimization may be run in conjunction with a computer system which may comprise a software server. A number of software servers together may form a cluster, or logical network of computer systems programmed with software programs that communicate with each other and work together to process requests.

Figure 6:
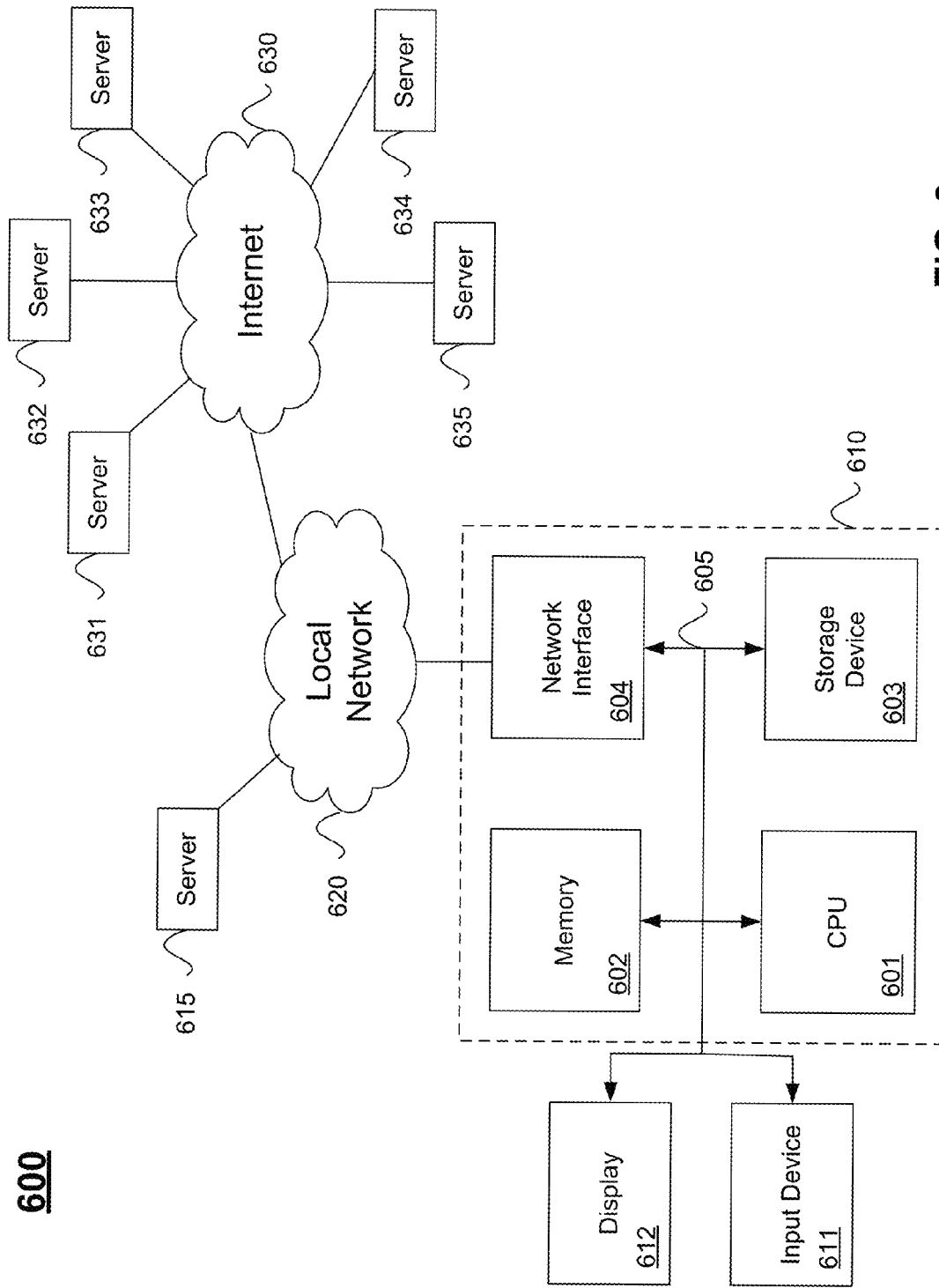
FIG. 6 illustrates an example of a computer system.

An example computer system 610 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both.

A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable media. The computer system generally described in FIG. 6 includes at least those attributes described in FIG. 5.

Computer system 610 may be coupled via bus 605 to a display 612, such as a cathode ray tube (CRT) or liquid crystal display (LCD), for displaying information to a computer user. An input device 611 such as an in-vehicle touch screen, is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be for Broadband Wireless Access (BWA) technologies. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein.

In an example involving the Internet, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
providing in a non-transitory computer readable storage medium at a server, a database comprising data organized in tables;
posing a query to the database through an engine;
causing the engine to provide to a user, a visual representation of a database query plan search space, wherein the visual representation comprises a tree structure including a plurality of nodes, and wherein a cost is associated with each of the plurality of nodes;
causing the engine to provide to the user, a second visual representation of the database query plan search space, wherein the second visual representation comprises a plurality of polygons, wherein the plurality of polygons correspond to the plurality of nodes, and wherein an area of each polygon depends on the cost of each corresponding node;

based upon the visual representation of the database query plan search space, providing a query plan manipulation request to the database through the engine, wherein the query plan manipulation request corresponds to a direct manipulation of the visual representation;

returning to the engine from the database, a result of the query plan manipulation request;

causing the engine to display the result to the user; and storing the result in a second non-transitory computer readable storage medium.

2. The method of claim 1 further comprising displaying the cost of an individual node based upon interaction between the user and the visual representation through an interface.

3. The method of claim 1 wherein the result comprises an actual execution time.

4. The method of claim 1 wherein the result comprises an estimated cost generated by an optimizer module.

5. The computer-implemented method of claim 1, further comprising:

receiving a user selection; and selectively displaying one of the visual representation and the second visual representation, according to the user selection.

6. The computer-implemented method of claim 1, wherein the plurality of polygons includes at least two overlapping rectangles.

7. The computer-implemented method of claim 1, wherein the plurality of polygons includes a first rectangle that is completely overlapped by a second rectangle.

8. The computer-implemented method of claim 1, wherein the plurality of polygons includes a first rectangle associated with a first cost that is overlapped by a second rectangle associated with a second cost, wherein the first cost is less than the second cost.

9. The computer-implemented method of claim 1, wherein the plurality of polygons includes a first rectangle, a second rectangle, and a third rectangle, wherein the first rectangle completely overlaps the second rectangle and the third rectangle, and wherein the second rectangle and the third rectangle do not overlap.

10. A non-transitory computer readable storage medium embodying a computer program for performing a method, said method comprising:

posing through an engine, a query to a database stored in a second non-transitory computer readable storage medium at a server, the database comprising data organized in tables;

causing the engine to provide to a user, a visual representation of a database query plan search space, wherein the visual representation comprises a tree structure including a plurality of nodes, and wherein a cost is associated with each of the plurality of nodes;

causing the engine to provide to the user, a second visual representation of the database query plan search space, wherein the second visual representation comprises a plurality of polygons, wherein the plurality of polygons correspond to the plurality of nodes, and wherein an area of each polygon depends on the cost of each corresponding node;

based upon the visual representation of the database query plan search space, providing a query plan manipulation request to the database through the engine, wherein the query plan manipulation request corresponds to a direct manipulation of the visual representation;

returning to the engine from the database, a result of the query plan manipulation request;

causing the engine to display the result to the user; and storing the result in the non-transitory computer readable storage medium.

11. The non-transitory computer readable storage medium of claim 10 further comprising code to display the cost of an individual node, based upon interaction between the user and the visual representation through an interface.

12. The non-transitory computer readable storage medium of claim 10 wherein the result comprises an actual execution time.

13. The non-transitory computer readable storage medium of claim 10 wherein the result comprises an estimated cost generated by an optimizer module.

14. A computer system comprising:

one or more processors;

a non-transitory computer readable storage medium storing a software program, executable on said computer system, the software program configured to:

pose through an engine, a query to a database stored in a second non-transitory computer readable storage medium at a server, the database comprising data organized in tables;

cause the engine to provide to a user, a visual representation of a database query plan search space, wherein the visual representation comprises a tree structure including a plurality of nodes, and wherein a cost is associated with each of the plurality of nodes;

causing the engine to provide to the user, a second visual representation of the database query plan search space, wherein the second visual representation comprises a plurality of polygons, wherein the plurality of polygons correspond to the plurality of nodes, and wherein an area of each polygon depends on the cost of each corresponding node;

based upon the visual representation of the database query plan search space, provide a query plan manipulation request to the database through the engine, wherein the query plan manipulation request corresponds to a direct manipulation of the visual representation;

return to the engine from the database, a result of the query plan manipulation request;

cause the engine to display the result to the user; and store the result in the non-transitory computer readable storage medium.

15. The computer system of claim 14 further comprising displaying the cost of an individual node, based upon interaction between the user and the visual representation through an interface.

16. The computer system of claim 14 wherein the result comprises an actual execution time.

17. The computer system of claim 14 wherein the result comprises an estimated cost generated by an optimizer module.

* * * * *